3,058,810
PROCESS FOR PRODUCING FERROUS CARBONATE AND REMOVING OIL FROM AMMONIA THEREWITH
Edward E. Huxley and John Fetchin, Pasadena, Tex., assignors to Phillips Petroleum Company, a corporation of Delaware
Filed June 1, 1960, Ser. No. 33,155
8 Claims. (Cl. 23—199)

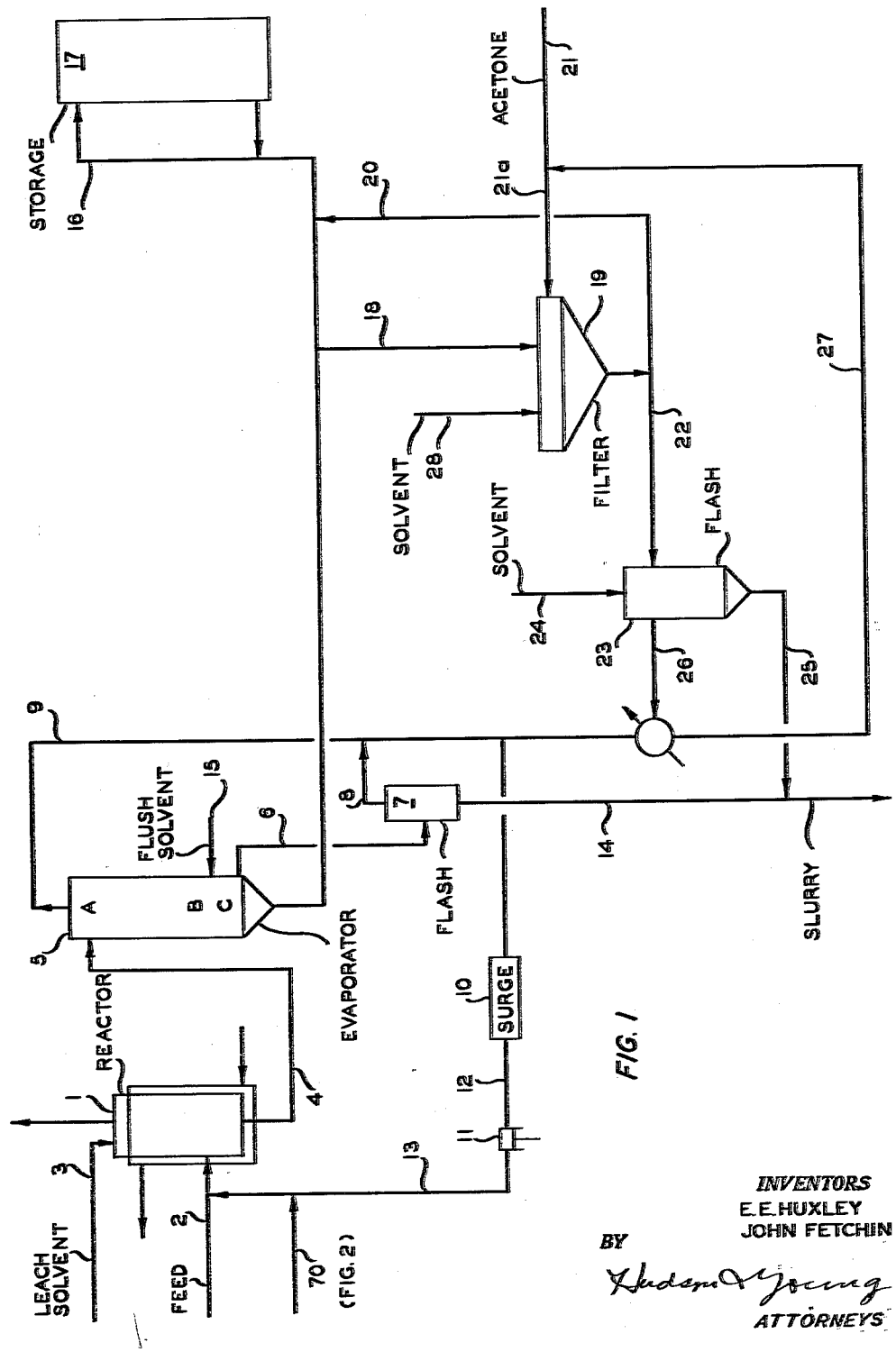

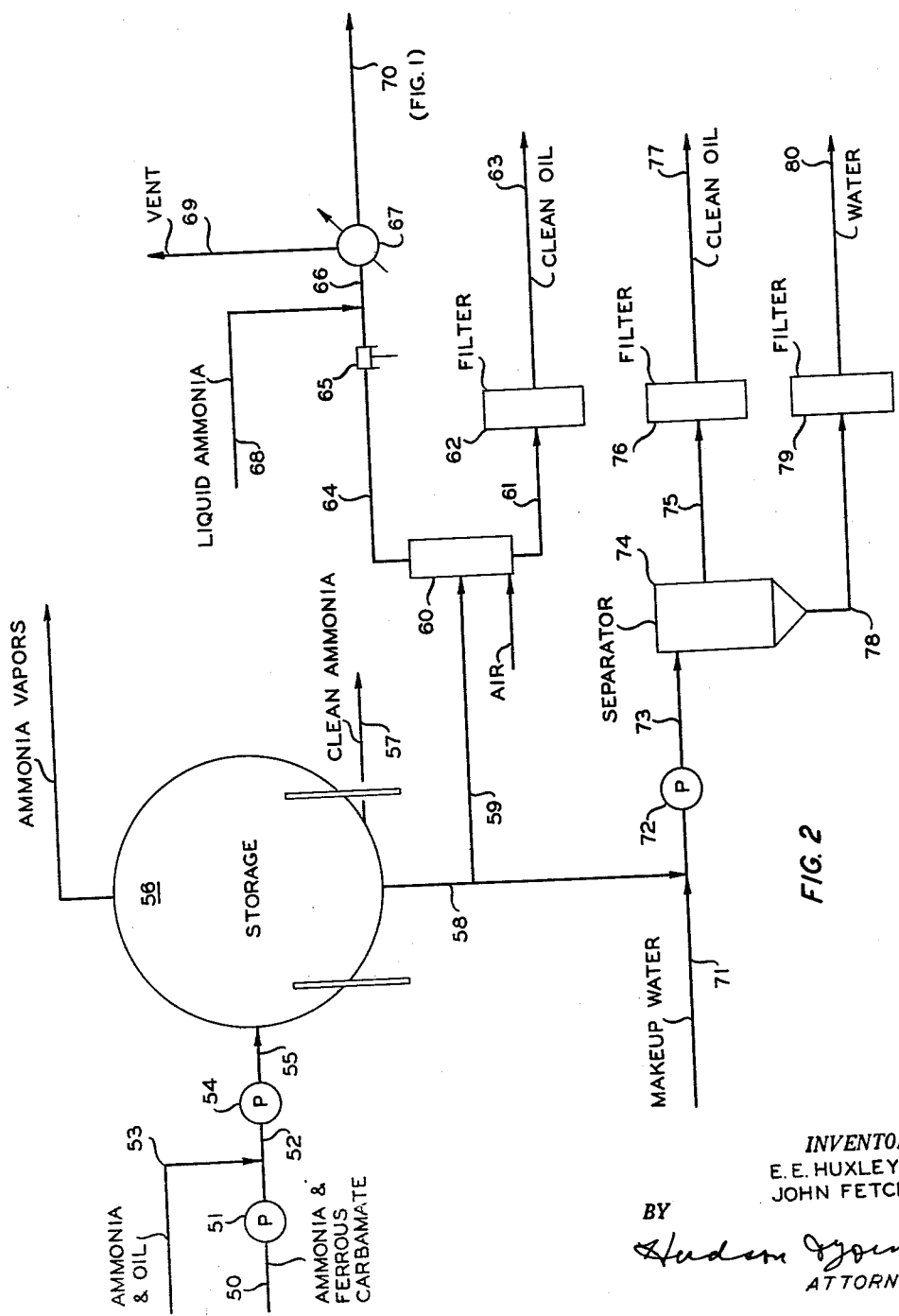

This invention relates to deoiling of ammonia. In one of its aspects, the invention relates to the provision of a novel complex, adduct or composition, said composition being suited for use in deoiling ammonia. In another of its aspects, this invention relates to the formation of a novel complex, adduct or composition and its use in the deoiling of ammonia with formation of a further complex from which oil can be recovered while at the same time elements of the complex can also be recovered and reused to form the first above-mentioned composition. In a further aspect of the invention, it relates to the reaction of ammonia, carbon dioxide and steam with iron or an iron compound to form a ferrous carbamate containing reaction mass, also containing ammonium carbamate and urea, from which ferrous carbamate is recovered, purified and admixed with anhydrous ammonia containing oil backed up by the ammonia from lubricated equipment with which the ammonia has been synthesized, separating a thus-formed ammonium carbamate-oil complex, which may be accompanied by some excess oil, loosely held by the complex, thus recovering purified synthesized ammonia. In a still further aspect of the invention, it relates to a white amorphous composition having the following formula

$$[Fe(NH_2CO_2)_2]_2[NH_4NH_2CO_2]_2[oil]_x[NH_3]_3$$

In a still further aspect of the invention, it relates to the recovery from the above-mentioned ferrous carbamate containing reaction mass of ammonium carbamate and urea by washing the same with acetone or other solvent which will dissolve urea and ammonium carbamate to obtain purified ferrous carbamate from which any residual acetone can be washed employing anhydrous ammonia, then recovering the thus-purified ferrous carbamate with anhydrous ammonia for eventual use as herein described or otherwise. In a further aspect still, the invention relates to the recovery of acetone from the washings from the ferrous carbamate purification by heating said washings obtaining acetone and ammonia containing vapors from which acetone is condensed, for possible reuse and the remaining ammonia is returned for use in preparing ferrous carbamate, as described. In a still further aspect, the invention contemplates obtaining urea and ammonium carbamate dissolved in ammonia from the leaching of ferrous carbamate reaction mass by evaporating a substantial proportion of the ammonia used to leach the reaction mass, thus obtaining a solution of urea and ammonium carbamate in ammonia with precipitation of ferrous carbamate, permitting removal of most of the urea and ammonium carbamate formed in the ferrous carbamate forming reaction. Still further in another aspect, the invention contemplates heating the urea and ammonium carbamate-ammonia solution obtaining ammonia vapors which can be returned for reuse in the process. In a still further aspect of the invention, the ammonium carbamate-oil complex which is formed is treated with air at elevated temperature to recover ammonia and carbon dioxide which can be reused in the process and oil and iron oxide from which the iron oxide can be separated and used to provide the iron compound or the iron of the process. In a further aspect, the last-mentioned complex can be treated with water to obtain an oil phase and a water phase, the oil phase is filtered to remove therefrom any solids such as precipitated iron compounds, obtaining iron compounds which can be used as the source of iron for the ferrous carbamate forming reaction and the water phase can be treated with sulfuric acid to obtain carbon dioxide which can be used for the last said reaction.

In the preparation of anhydrous ammonia, according to well-known synthetic method of operation, there results in the ammonia oil which enters the ammonia from the lubricant used in compressors or other equipment related to the manufacture of ammonia. This oil is considered as a contaminant and must be removed. We have now found that ferrous carbamate will form a complex when it is admixed with anhydrous ammonia containing oil, bringing down the oil in the complex, so that, upon separation of the complex, the ammonia is left essentially oil free.

We have also found that we can prepare ferrous carbamate by reacting ammonia, carbon dioxide, steam and iron or an iron compound, such as iron carbonate, at elevated temperature and pressure to form a ferrous carbamate containing reaction mass from which the carbamate is recovered essentially as herein described.

It is an object of this invention to provide a process for the preparation of an oil-free ammonia. It is another object of the invention to provide an agent which is capable of forming a complex with oil in anhydrous ammonia. It is another object of this invention to provide a method for the recovery of ferrous carbamate from a reaction mass containing the same. It is another object of this invention to purify ferrous carbamate recovered from the reaction mass containing the same. It is a further object of this invention to provide a method of treating anhydrous ammonia contaminated with oil to remove the oil therefrom while obtaining a complex from which ingredients going into the manufacture of the ferrous carbamate can be recovered.

Other aspects, objects and the several advantages of the invention are apparent from a study of this disclosure, the drawing, and the appended claims.

According to the present invention, there is provided a process for the removal of oil from anhydrous ammonia contaminated therewith which comprises reacting together ammonia, carbon dioxide and water vapor with at least one of iron and an iron compound at a temperature in the approximate range 500–800° F. and a pressure in the approximate range 100–120 atmospheres, leaching the reaction product including ferrous carbamate from the reaction mass employing anhydrous ammonia as a solvent, recovering ferrous carbamate containing reaction mass from the leaching ammonia solvent by evaporating ammonia therefrom, treating the thus recovered ferrous carbamate containing reaction mass with an acetone solvent to extract from said mass urea and ammonium carbamate therefrom, washing the extracted mass with anhydrous ammonia to remove acetone therefrom, dissolving the thus purified ferrous carbamate and liquid ammonia, combining the ferrous carbamate-ammonia solution with oil contaminated ammonia, settling the mass thus obtained, obtaining clear anhydrous ammonia free from oil as a product of the process, heating acetone resulting from the earlier steps leading to recovery of purified ferrous carbamate to recover acetone and some ammonia vapor, cooling to condense and recover acetone, which can be reused, and ammonia vapors, returning ammonia vapors to again react with carbon dioxide, steam and at least one of iron and an iron compound, as earlier described, obtaining, upon heating of the acetone, urea and ammonium carbamate, taking up the urea and ammonium carbamate in anhydrous ammonia and separating the resulting solution as a product of the process, treating ammonium carbamate-oil complex removed from purified ammonia at a temperature in the approximate range 200–300° F. with air obtaining ammonia and carbon dioxide, obtaining a mixture of gases containing air, ammonia and carbon dioxide, separating air from said gases, returning ammonia and carbon dioxide to the reaction forming ferrous carbamate, obtaining from the heating of the complex an oil-iron oxide mixture, filtering iron oxide from said mixture to obtain a lubricating oil.

It will be evident to those skilled in the art in possession of this disclosure, having studied the same, that the foregoing statement of invention includes many subordinate or correlated inventions, each of which contributes to the making up of the whole combination process. This will be evident from the claims.

In the drawing, FIGURE 1 is a diagrammatic showing of a batch operation for the preparation of ferrous carbamate while FIGURE 2 is a diagrammatic showing of the application of ferrous carbamate to remove oil from anhydrous ammonia and the recovery of the oil and ammonia in the process.

Although batch operation is illustrated, it will be obvious to those skilled in the art in possession of this disclosure and having studied the same that continuous operation can be effected without basically changing the steps of the invention.

Referring now to FIGURE 1, 1 is a reactor which is substantially filled with metallic iron, in this case, 12 mesh size, but which can be filled with an iron compound, such as ferrous carbonate, etc. The reactor is heated to an elevated temperature, preferably in the range 400–800° F., and kept at this temperature while it is charged by way of pipe 2 with carbon dioxide, ammonia and steam. About 75 percent ammonia, 20 percent carbon dioxide and 5 percent steam, by weight, are added to the reactor, an excess of the iron or iron compound is present, the gases are introduced until, on a weight basis, the reactor contains 10,000 pounds of the carbon dioxide, ammonia and steam mixture. The reactor pressure is allowed to increase to a pressure of approximately 100–120 atmospheres and the charge allowed to react until the pressure has fallen to approximately 25–50 atmospheres, following which the reactor is cooled and anhydrous ammonia fed by way of pipe 3 into the reactor bed and allowed to remain until the reaction products are substantially dissolved. Following the leaching step, the anhydrous ammonia solvent, which now contains ferrous carbamate, ammonium carbamate and urea is passed by pipe 4 into ammonia evaporator 5 which is filled to level A. Ammonia is then allowed to evaporate from evaporator 5 at atmospheric pressure until the temperature of the liquid ammonia in the evaporator reaches about −30° F. At this time, the ammonia has been evaporated approximately down to level B and it contains most of the urea and ammonium carbamate in solution whereas the ferrous complex will have precipitated out and will be found settled below level C, its solubility approximately .07 percent at −30° F. in the solution there contained. The liquid ammonia containing the urea and ammonium carbamate is removed from evaporator 5, passed by pipe 6 to ammonia flash vaporizer 7 from which ammonia vapors are removed at 8, joining vapors removed from evaporator 5 by way of pipe 9 for return to surge tank 10 from which compressor 11 draws the ammonia by way of pipe 12 and pumps it by way of pipe 13 to pipe 2. The concentrated slurry of ammonia, urea and ammonium carbamate is removed from vaporizer 7 by way of pipe 14. Anhydrous ammonia is then pumped by way of pipe 15 into evaporator 5 wherein it dissolves the ferrous carbamate which can be pumped to storage by way of pipe 16, storage being indicated at 17. However, it is now desired to pump the ferrous carbamate-anhydrous ammonia solution from evaporator 5 by way of pipe 16 and pipe 18 to pressure filter 19 wherein undissolved ferrous carbamate which is washed from the evaporator with liquid ammonia will be filtered, dissolved ferrous carbamate passing through the filter dissolved in anhydrous ammonia and by pipe 20 back to pipe 16 for storage at 17. The ferrous carbamate in the filter is washed with acetone introduced by pipe 21, or with other suitable solvent, to dissolve the urea and ammonium carbamate which it may contain, leaving ferrous carbamate on the filter, washings passing by pipe 22 to acetone flash vaporizer 23 from which ammonia is recovered and urea and ammonium carbamate recovered at 25, acetone recovered by means of conduit 26 is cooled and condensed and recycled for reuse by pipe 27 to pipe 21. Anhydrous ammonia is then passed to the filter 19 by way of pipe 28, washing ferrous carbamate therefrom by way of pipe 20 and pipe 16 to storage.

The equipment, as one skilled in the art will understand, will have to resist corrosion and, therefore, suitable materials of construction will have to be used. Glass-lined equipment or special alloy or silver material equipment can be used.

Referring now to FIGURE 2, ferrous carbamate is proportioned by way of pipe 50, proportioning pump 51 and pipe 52 into anhydrous ammonia from a synthesized ammonia process fed to the purification according to the invention by way of pipe 53. The ammonia usually will contain 2–5 parts per million oil. The admixture is pumped by pump 54, pipe 55 into anhydrous ammonia treatment and storage tank 56 which, maintained at 20–40° F., settles a ferrous carbamate-oil complex in about 24 hours, permitting removal of clear anhydrous ammonia containing no oil by way of pipe 57. Thus, it will be seen that, according to the invention, there has been provided a relatively rapid purification of anhydrous ammonia to remove the oil therein.

In a first recovery system which permits the recovery of materials useful in the overall invention as described in connection with both FIGURES 1 and 2, ammonium carbamate-oil complex is withdrawn from tank 56 by way of pipe 58 and passed by way of pipe 59 to steam heated treating tower 60 which, maintained at 200–300° F., will decompose the complex, yielding an oil-iron oxide mixture which, withdrawn by pipe 61 and filtered in filter 62, yields a clean lubricating oil by pipe 63. Overhead from tower 60 passes by pipe 64 and is compressed by pump 65 and passed by pipe 66 to refrigerated cooler 67, together with liquid anhydrous ammonia injected in sufficient amounts by way of pipe 68 to keep carbon dioxide dissolved, permitting air to be separated by vent pipe 69. This air can be water scrubbed to recover small amounts of ammonia which may be therein contained. Finally, anhydrous ammonia and carbon dioxide passed by way of pipe 70 into pipe 13 of FIGURE 1, thus completing the cycle of use of ammonia and carbon dioxide in the purification of ammonia to remove oil contaminant therefrom. Similarly, as desired, iron oxide can be returned to the process of FIGURE 1 following conversion to metallic iron or to an iron compound, such as ferrous carbonate, completing the cycle of the use of iron and/or its compound in the purification of ammonia to remove liquid oil contaminant therefrom.

In an alternate recovery of oil, etc. from the ammonium carbamate-oil complex from pipe 58, some or all of the complex is passed from pipe 58, together with water injected by pipe 71, pump 72 and pipe 73, into separator 74 in which oil and water phases form. Oil phase is taken off by pipe 75, filtered at 76, resulting in clean lubricating oil at 77. Water phase is withdrawn by pipe 78, together with precipitated iron hydroxide, which is filtered from the water phase at 79, resulting in an aqueous phase in pipe 80 which can be acidified with sulfuric acid to recover additional carbon dioxide. The aqueous phase can be sent to a sulfate plant wherein ammonium sulfate is prepared.

It will be clear to one skilled in the art in possession of this disclosure having studied the same that reasonable modification or change can be made in the several steps of the operation while still obtaining results according to the invention. Also, temperatures, pressures and times, as well as other conditions given herein by way of example, are not limiting so long as the particular feature or essence of the inventive step is being accomplished according to the teachings hereof.

Essentially, the reaction of ammonium carbamate, $NH_4NH_2CO_2$, with iron or iron compounds at a temperature in the approximate range 500–800° F. and at a pressure in the approximate range 100–120 atmospheres will result in forming ferrous carbamate, ferrous amino formate—$Fe(NH_2CO_2)_2$, ferrous ammonium carbamate, $FeNH_4(NH_2CO_2)_2$ and ammonium carbamate, $$NH_4NH_2CO_2$$

which is a mixture of compounds readily soluble in boiling anhydrous ammonia at atmospheric pressure.

As indicated, the mixing of anhydrous ammonia containing the above mixture of compounds with anhydrous ammonia containing dissolved or suspended hydrocarbon oils results in the formation of a complex. This complex is ordinarily recognized as a white flocculent material insoluble in anhydrous ammonia.

Upon evaporating the anhydrous ammonia, a white, amorphous dry, powdery white solid remains, which has the following chemical composition.

| Component: | Weight percent |
| --- | --- |
| Iron | 17.9 |
| Carbon dioxide | 26.2 |
| Ammonia | 26.2 |
| Oil and organics | 30.6 |
|  | 100.9 |

This white amorphous complex has the following formula:

$$[Fe(NH_2CO_2)_2]_2[NH_4NH_2CO_2]_2[oil]_x[NH_3]_3$$

The complex is stable at room temperature under inert gases. Upon exposure to air, the complex is rapidly decomposed, with the loss of ammonia and carbon dioxide gas, the iron being oxidized to red ferric oxide or hydroxide. The oil and iron oxide or hydroxide remain as a red oily residue.

Upon adding water to the complex, ammonia and carbon dioxide are dissolved in the water, ferrous hydroxide is precipitated, and the oil separates from the complex and floats on the surface of the water.

The following further exemplifies the concepts and basic operations of the invention:

SPECIFIC EXAMPLES FOR PRODUCTION OF FERROUS CARBAMATE [1]

*Example I–A*

[Calculation based on 10,000 lb. charge to reactor]

Line 2—feed to reactor, lbs. per charge _____ 10,000
    Steam, lbs. _____ 500
    Carbon dioxide, lbs. _____ 2,000
    Ammonia, lbs. _____ 7,500

Line 3—solvent, anhydrous ammonia, lbs. _____ 10,400

Reactor 1:
    Temperature, ° F. _____ 600
    Initial pressure, lbs./sq. in. _____ 1,500
    Final pressure, lbs./sq. in. _____ 550
    Reaction time, hrs. _____ 4
    Leaching time, hrs. _____ 1

Ammonia evaporator 5:
    Pressure _____ Atmospheric
    Final temperature, ° F. _____ −30

Line 6—urea and ammonium carbamate in $NH_3$, lbs. _____ 2,600
Line 8—$NH_3$ vapors, lbs. _____ 7,800
Line 14—concentrated slurry $NH_3$, urea and ammonium carbamate, lbs. _____ 5,200
Line 15—anhydrous $NH_3$, lbs. _____ 500 to 1,000
Storage tank 17—product, lbs. _____ 134,067
    Anhydrous ammonia, lbs. _____ 134,000
    Ferrous carbamate, lbs. _____ 67

[1] Without using filter 19 and auxiliary equipment—see Figure 1.

PURIFICATION OF FERROUS CARBAMATE [1]

*Example I–B*

REACTION PRODUCT FROM LINE 16 THROUGH LINE 18

Pressure filter 19:
    Pressure, lbs./sq. in. _____ 25–50
    Temperature, ° F. _____ 50–100

Line 20—pure ferrous carbamate in anhydrous $NH_3$, lbs. [2] _____ 1,067
    Ferrous carbamate, lbs. _____ 67

Line 21A—acetone, lbs. [3] _____ 6,700

Line 22—rate _____ lbs./min__ 100

Acetone flash vaporizer 23:
    Pressure, lbs./sq. in. _____ Atmospheric
    Temperature, ° F. _____ 134

Line 25—urea and ammonium carbamate in anhydrous $NH_3$, lbs. _____ 2,600

Line 28—anhydrous $NH_3$, lbs. _____ 134,000

[1] Using filter 19 and auxiliary equipment.
[2] This is undissolved $Fe(NH_2CO_2)_2$ washed to filter by anhydrous $NH_3$.
[3] Acetone at 80° F.—containing less than 2 percent $H_2O$.

After removing the urea and ammonium carbamate by dissolving in acetone, the remaining ferrous carbamate is dissolved in anhydrous $NH_3$. This is done by passing anhydrous $NH_3$ over the ferrous carbamate on the filter. The anhydrous $NH_3$ is heated to 150–170° F. and the pressure on filter 19 is 600–800 p.s.i.g. The solution is formed with $NH_3$ at ambient temperature and at 80° F., the pressure on the filter is 150–200 p.s.i.g. The rate of flow for dissolving is 100–200 lbs./min. of $NH_3$ through the filter.

SPECIFIC EXAMPLE FOR DEOILING ANHYDROUS AMMONIA [1]

*Example II–A*

Line 50—treating material, tons/day _____ 5.0
    $Fe(NH_2CO_2)_2$, lbs./day_____ 5
Line 53—feed, anhydrous ammonia + oil impurity, tons/day _____ 600
    Concentration of oil _____ p.p.m__ 5
Tank 56—anhydrous ammonia storage tank:
    Temperature, ° F. _____ 30
    Pressure, lbs./in. _____ atmos__ 11.5
    Settling time, hrs. _____ 18
Line 59—ammonium carbamate oil complex and oil, lbs./day _____ 24
Stripper and decomposition zone 60:
    Temperature, ° F. _____ 250
    Pressure, lbs./sq. in. _____ Atmospheric or vacuum
    Air, cu. ft./min. _____ 100
Line 63—clean oil recovered, lbs./day _____ 6

[1] Using decomposition zone 60—see Figure 2.

*Example II–B*

[Using oil-water separator 74]

Line 77—clean oil recovered, lbs./day _____ 6
Line 80—weak ammonium hydroxide, gals. _____ 16
    Percent $NH_3$ _____ 10

Reasonable variation and modification are possible within the scope of the foregoing disclosure, the drawing and the appended claims to the invention the essence of which is that (1) Ferrous carbamate has been obtained from carbon dioxide, ammonia, water vapor and iron and/or a compound thereof;

(2) Ferrous carbamate reaction product thus obtained and recovered from anhydrous ammonia solvent with which it is leached from the reaction zone and further recovered from the solvent by evaporation of the solvent precipitating ferrous carbamate when treated with anhydrous ammonia yields ammonium carbamate and urea also obtained in the reaction involved in (1) above;

(3) Extraction of the anhydrous ammonia treated ferrous carbamate product with acetone yields urea and ammonium carbamate leaving behind ferrous carbamate;

(4) Ferrous carbamate is washed with anhydrous ammonia to remove acetone or other solvent used to dissolve the urea from ferrous carbamate obtaining purified ferrous carbamate which is dissolved in liquid ammonia;

(5) Ferrous carbamate dissolved in liquid ammonia is added to anhydrous ammonia contaminated with oil, as picked up from lubricated equipment employed in the manufacture of ammonia, the mixture allowed to settle to obtain clear anhydrous ammonia free from oil;

(6) Ammonium carbamate-oil complex thus obtained is separated from the treated ammonia, heated in presence of air to recover ammonia and carbon dioxide which are reused to form additional ferrous carbamate and oil which, upon filtration or other further treatment, is suitable for eventual use as lubricating oil; and that (7) The ammonium carbamate-oil complex, as desired, can be treated with water to obtain an oil phase from which oil can be recovered and a water phase which can be sent to a sulfate plant but which can be treated with acid to recover carbon dioxide for further use in the preparation of additional ferrous carbamate.

We claim:

1. A process for the removal of oil contained as an impurity in anhydrous ammonia and found therein as a result of solution or suspension of the oil in the ammonia during the course of its preparation in equipment lubricated with said oil which comprises: reacting ammonia, carbon dioxide and water vapor at an elevated temperature of approximately 400 to 800° F. with a member selected from the group consisting of iron and iron carbonate at an elevated pressure of approximately 100 to 120 atmospheres to form a reaction product containing ferrous carbamate, recovering ferrous carbamate from the reaction product, intermingling the ferrous carbamate with oil-contaminated ammonia, obtaining an intermingled mass, separating from the intermingled mass an insoluble oil-ferrous carbamate complex thus formed, thereby recovering purified ammonia free from oil.

2. A process for the removal of oil from anhydrous ammonia concentrated therewith which comprises reacting together ammonia, carbon dioxide and water vapor with a member selected from the group consisting of iron and iron carbonate at a temperature in the approximate range 500–800° F. and a pressure in the approximate range 100–120 atmospheres so as to form a ferrous carbamate containing reaction mass, leaching the reaction product including ferrous carbamate from the reaction mass by employing anhydrous ammonia as a solvent, recovering a ferrous carbamate containing reaction mass from the leaching ammonia solvent by evaporating ammonia therefrom, treating the thus recovered ferrous carbamate containing reaction mass with an acetone solvent to extract from said mass urea and ammonium carbamate therefrom, washing the extracted mass with anhydrous ammonia to remove acetone therefrom, dissolving the thus purified ferrous carbamate in liquid ammonia, combining the ferrous carbamate-ammonia solution with oil-contaminated ammonia, settling the mass thus obtained thereby obtaining clear anhydrous ammonia free from oil as a product of the process, heating acetone resulting from the earlier steps leading to recovery of purified ferrous carbamate to recover acetone and some ammonia vapor, cooling to condense and recover acetone, which can be reused, and ammonia vapors, returning ammonia vapors to again react with carbon dioxide, steam and a member selected from the group consisting of iron and iron carbonate obtaining, upon heating of the acetone, urea and ammonium carbamate, taking up the urea and ammonium carbamate in anhydrous ammonia and separating the resulting solution as a product of the process, treating ammonium carbamate-oil complex removed from purified ammonia at a temperature in the approximate range 200–300° F. with air so as to obtain ammonia and carbon dioxide, obtaining a mixture of gases containing air, ammonia and carbon dioxide, separating air from said gases, returning ammonia and carbon dioxide to the reaction forming ferrous carbamate, obtaining from the heating of the complex an oil-iron oxide mixture, and filtering iron oxide from said mixture to obtain a lubricating oil.

3. A process according to claim 2 wherein, in lieu of the heating with air, at least a portion of the ammonium carbamate-oil complex is mixed with water forming an oil phase and a water phase, the oil phase is filtered to recover lubricating oil, the water phase is treated with acid to recover carbon dioxide which is returned for use in the ferrous carbamate forming reaction.

4. The treatment of oil-contaminated ammonia to remove the oil therefrom which comprises admixing ferrous carbamate with said ammonia, obtaining a ferrous carbamate ammonium carbamate-oil complex, and separating said complex from the thus treated ammonia to recover oil-free ammonia.

5. A process for the preparation of ferrous carbamate which comprises reacting ammonia, carbon dioxide and steam in the presence of a member selected from the group consisting of iron and iron carbonate at elevated temperature of approximately 400 to 800° F. and pressure of approximately 100 to 120 atmospheres to form a reaction mixture containing ferrous carbamate, ammonium carbamate and urea, leaching the reaction mixture with anhydrous ammonia thus taking up said reaction mixture from the ferrous carbamate containing reactant, reducing the pressure on the solution thus formed, obtaining a concentrate containing ferrous carbamate, ammonium carbamate and urea, solvent extracting the concentrate with acetone to extract urea and ammonium carbamate from remaining ferrous carbamate, and remaining ferrous carbamate, and recovering ferrous carbamate in thus purified form.

6. A method of forming and recovering a ferrous carbamate concentrate which comprises reacting ammonia, carbon dioxide and steam with a member of the group consisting of iron and iron carbonate at an elevated temperature of approximately 400 to 800° F. and pressure of approximately 100 to 120 atmospheres so as to form a ferrous carbamate containing mixture also containing ammonium carbamate and urea, leaching ferrous carbamate containing reaction mass from the iron or iron compound with anhydrous liquid ammonia solvent, evaporating a substantial portion of solvent to obtain precipitated ferrous carbamate, the remaining solvent containing most of the ammonium carbamate and urea earlier leached into the solvent and recovering the ferrous carbamate as a product of the process.

7. The process of claim 1 wherein the insoluble oil-ferrous carbamate complex is treated to recover therefrom ammonia and carbon dioxide and the ammonia and carbon dioxide being subsequently returned for reuse in the formation of further ferrous carbamate.

8. The process of claim 5 wherein the reaction is carried out at a temperature in the approximate range of 500° F.–800° F. and at a pressure in the approximate range of 100–120 atmospheres.

References Cited in the file of this patent
UNITED STATES PATENTS
2,014,512    Stock _____ Sept. 17, 1935

UNITED STATES PATENT OFFICE
CERTIFICATE OF CORRECTION

Patent No. 3,058,810                                    October 16, 1962

Edward E. Huxley et al.

It is hereby certified that error appears in the above numbered patent requiring correction and that the said Letters Patent should read as corrected below.

In the drawings, Sheets 1 and 2, lines 2 and 3 thereof, and in the heading to the printed specification, lines 2 to 4, title of invention, for "PROCESS FOR PRODUCING FERROUS CARBONATE AND REMOVING OIL FROM AMMONIA THEREWITH", each occurrence, read -- PROCESS FOR PRODUCING FERROUS CARBAMATE COMPLEX AND REMOVING OIL FROM AMMONIA THEREWITH --; column 8, lines 57 and 58, strike out "and remaining ferrous carbamate,"

Signed and sealed this 16th day of April 1963.

(SEAL)
Attest:

ERNEST W. SWIDER                                          DAVID L. LADD

Attesting Officer                                            Commissioner of Patents